Patented May 16, 1950

2,508,279

UNITED STATES PATENT OFFICE 2,508,279

METHOD OF PREPARING ACRYLAMIDE

Myrl Lichtenwalter, Port Arthur, Tex., and Oscar F. Wiedeman, Arcadia, Calif., assignors to American Cyanamid Company, New York, N. Y., a corporation of Maine No Drawing. Application August 6, 1948, Serial No. 43,011

2 Claims. (Cl. 260—561)

This invention relates to the production of acrylamide, and more particularly to an improved method of preparing acrylamide from hydracrylamide which involves the removal of water from the latter according to the equation

$$HOCH_2CH_2CONH_2 \rightarrow CH_2=CHCONH_2 + H_2O$$

Hydracrylamide may be prepared by the reaction of hydracrylic acid lactone with ammonia according to the method described in U. S. Patent No. 2,375,005. A method for converting beta-hydroxy monocarboxylic acid amides into alpha-beta unsaturated nitriles, also disclosed in this patent, comprises passing vapors of the amide over a heated dehydration catalyst such as aluminum oxide, thorium oxide, zirconium oxide, titanium oxide, silica gel, and the like. For example, hydracrylamide is converted into acrylonitrile by passing the vaporized amide over alumina at 400° C.

The reactions involved in the vapor-phase conversion of hydracrylamide to acrylonitrile are believed to proceed as indicated by the following equations

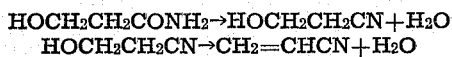
$$HOCH_2CH_2CONH_2 \rightarrow HOCH_2CH_2CN + H_2O$$
$$HOCH_2CH_2CN \rightarrow CH_2=CHCN + H_2O$$

In the method disclosed in the above patent for the preparation of hydracrylamide by reaction of hydracrylic acid lactone with anhydrous liquid ammonia, the reaction product, after disposing of the excess ammonia, is distilled at 165°–175° C. at a pressure of 4 mm. of mercury to recover the hydracrylamide. No mention is made as to whether any of the hydracrylamide was converted to acrylamide in this distillation. Should such a conversion occur, the acrylamide would be present in the volatile material and not in the residue remaining in the distillation vessel. However, in carrying out the process of the above patent and an analysis of the residue in the distilling vessel, we found no acrylamide in the residue.

As shown in our copending application Serial No. 569,282, filed December 21, 1944, now abandoned, of which the present application is a continuation-in-part, small quantities (yields of 5–10%) of acrylamide are obtained when hydracrylamide is heated under reduced pressure at a temperature no higher than about 190° C. and below the boiling point of hydracrylamide at the pressure used. In this operation, the acrylamide distills away from the reaction zone and is condensed in a suitable receiving vessel. This liquid-phase dehydration of hydracrylamide to acrylamide may also be effected in the presence of such alkaline or acidic catalysts as calcium hydroxide, barium hydroxide, barium oxide, magnesium oxide, sulfuric acid, phosphoric acid, and ammonium acid phosphate, but again the yields of acrylamide are of low order and the process is not conducive to commercial operation.

It was most surprising, however, to find that the use of an anhydrous sodium carbonate as the dehydration catalyst results in good yields of acrylamide. The present invention, therefore, consists in a method for the preparation of acrylamide from hydracrylamide by heating the latter in the presence of an anhydrous sodium carbonate under reduced pressure and at a temperature no higher than about 190° C. and below the boiling point of hydracrylamide at the pressure used.

The term "an anhydrous sodium carbonate" when used in this specification and the appended claims is intended to include both sodium carbonate and sodium bicarbonate. Furthermore, a sodium carbonate containing one or more mols of water of crystallization may be employed in the process, but when used as such the water of crystallization is substantially removed by heating prior to the addition of the hydracrylamide.

The quantity of catalyst usually employed is from 2% to 5% of the weight of the hydracrylamide, however, quantities outside of this range can be used with satisfactory results.

It will be found advantageous to perform the dehydration reaction in a reaction vessel so arranged that the acrylamide as it is formed may be immediately removed from the reaction zone and condensed. This procedure is emphasized since the acrylamide tends to polymerize very rapidly under the influence of heat.

The invention is further illustrated by the following examples in which the parts are by weight.

Example 1

A mixture consisting of 25 parts of hydracrylamide and 1.25 parts of anhydrous sodium carbonate was heated in a distillation flask at a pressure of about 5 mm. for a period of ½ hour. The flask was immersed in an oil bath maintained at 155° C. 16 parts (80% yield) of acrylamide were collected in an air-cooled condenser connected to the distillation flask. The product was a white, flaky, crystalline material melting at 85° C.

Example 2

The procedure of Example 1 was repeated using a mixture consisting of 25 parts of hydracrylamide and 0.8 part of sodium bicarbonate heated during a period of 35 minutes. The temperature of the oil bath was maintained at 160° C. 15.2 parts (76% yield) of acrylamide were obtained.

Analysis of the distillation products of the present invention have failed to show acrylonitrile present. This is believed to conclusively show that the dehydration of hydracrylamide under the present conditions follows a completely different course than that of U. S. Patent No. 2,375,005.

The present invention provides a simple and economical method of producing acrylamide in good yield and of high purity.

While the invention has been described with particular reference to specific embodiments, it is to be understood that it is not to be limited thereto, but is to be construed broadly and restricted solely by the scope of the appended claims.

We claim:

1. A method of producing acrylamide which includes the steps of heating hydracrylamide in the presence of an anhydrous sodium carbonate under reduced pressure and at a temperature not higher than about 190° C. and below the boiling point of hydracrylamide at the pressure used for a length of time to distill off a quantity of acrylamide.

2. The method of claim 1 in which the pressure is approximately 5 mm., the temperature is about 155° C., and the heating is continued until substantially all the acrylamide has been distilled.

MYRL LICHTENWALTER.
OSCAR F. WIEDEMAN.

REFERENCES CITED

The following references are of record in the file of this patent:

UNITED STATES PATENTS

| Number | Name | Date |
|---|---|---|
| 2,375,005 | Kung | May 1, 1945 |